United States Patent
Gupta et al.

(10) Patent No.: US 10,944,512 B2
(45) Date of Patent: Mar. 9, 2021

(54) CODE BLOCK GROUP RETRANSMISSION

(71) Applicant: QUALCOMM Incorporated, San Diego, CA (US)

(72) Inventors: Piyush Gupta, Bridgewater, NJ (US); Jing Sun, San Diego, CA (US); Jing Jiang, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 10 days.

(21) Appl. No.: 16/178,100

(22) Filed: Nov. 1, 2018

(65) Prior Publication Data

US 2019/0158227 A1    May 23, 2019

Related U.S. Application Data

(60) Provisional application No. 62/587,990, filed on Nov. 17, 2017.

(51) Int. Cl.
| | |
|---|---|
| *H04L 1/08* | (2006.01) |
| *H04L 1/18* | (2006.01) |
| *H04L 5/00* | (2006.01) |
| *H04L 27/26* | (2006.01) |
| *H04W 84/04* | (2009.01) |

(52) U.S. Cl.
CPC .............. *H04L 1/08* (2013.01); *H04L 1/1893* (2013.01); *H04L 5/0044* (2013.01); *H04L 27/2601* (2013.01); *H04W 84/045* (2013.01)

(58) Field of Classification Search
CPC ........................................................ H04L 1/08
See application file for complete search history.

(56) References Cited

U.S. PATENT DOCUMENTS

| | | | | |
|---|---|---|---|---|
| 2009/0098876 A1* | 4/2009 | Khan | ................... | H04B 7/0413 455/445 |
| 2010/0195624 A1* | 8/2010 | Zhang | .................. | H04B 7/0413 370/335 |
| 2016/0338129 A1* | 11/2016 | Moulsley | .............. | H04L 5/0053 |
| 2019/0053201 A1* | 2/2019 | Nammi | ................. | H04L 1/1861 |

(Continued)

OTHER PUBLICATIONS

International Search Report and Written Opinion—PCT/US2018/058947—ISA/EPO—dated May 16, 2019.

(Continued)

*Primary Examiner* — Kevin M Cunningham
(74) *Attorney, Agent, or Firm* — QUALCOMM Incorporated

(57) ABSTRACT

Various aspects of the present disclosure generally relate to wireless communication. In some aspects, a transmitter device may transmit, using a plurality of codewords, a plurality of code block groups, wherein the plurality of codewords includes a first codeword associated with a first set of code block groups, of the plurality of code block groups, and a second codeword associated with a second set of code block groups of the plurality of code block groups. The transmitter device may retransmit, after a failure associated with at least one code block group of the first set of code block groups, the at least one code block group using the second codeword. In some aspects, the transmitter may retransmit the at least one code block group using the first codeword and transmit a new transport block using the second codeword. Numerous other aspects are provided.

28 Claims, 11 Drawing Sheets

(56) References Cited

U.S. PATENT DOCUMENTS

2019/0150122 A1* 5/2019 Ying .................. H04W 72/042
                                                         370/329
2019/0253204 A1* 8/2019 Takeda ................. H04L 1/1864

OTHER PUBLICATIONS

NTT DOCOMO: "Details on Resource Element Mapping," 3GPP Draft; R1-1714598 Resource Element Mapping 3rd Generation Partnership Project (3GPP), Mobile Competence Centre; 650, Route Des Lucioles; F-06921 Sophia-Antipolis Cedex; France, vol. RAN WG1, No. Prague, Czech Republic; Aug. 21, 2017-Aug. 25, 2017, Aug. 20, 2017, XP051328132, 12 pages, Retrieved from the Internet: URL: http://www.3gpp.org/ftp/tsg_ranWG1_RL1/TSGR1_90/Docs/ [retrieved on Aug. 20, 2017] p. 1, section 2.

VIVO: "Support of CBG-based (re) transmission," 3GPP Draft; R1-1717499_Support of CBG-Based (RE) Transmission, 3rd Generation Partnership Project (3GPP), Mobile Competence Centre; 650, Route Des Lucioles; F-06921 Sophia-Antipolis Cedex; France, vol. Ran WG1, No. Prgaue, CZ; Oct. 9, 2017-Oct. 13, 2017, Oct. 3, 2017, XP051352696, 5 Pages, Retrieved from the Internet: URL: http://www.3gpp.org/ftp/tsg_ran/WG1_RL1/TSGR1_90b/Docs/ [retrieved on Oct. 3, 2017] p. 3, section CBGFI.

Huawei et al., "On CBG-Based (Re)Transmission", 3GPP Draft, R1-1717074, 3rd Generation Partnership Project (3GPP), Mobile Competence Centre, 650, Route Des Lucioles, F-06921 Sophia-Antipolis Cedex, France, vol. RAN WG1, No. Prague, Czech Republic, Oct. 9, 2017-Oct. 13, 2017, Oct. 8, 2017 (Oct. 8, 2017), XP051340265, 8 Pages, Retrieved from the Internet: URL:http://www.3gpp.org/ftp/Meetings_3GPP_SYNC/RAN1/Docs/ [retrieved on Oct. 8, 2017].

Partial International Search Report—PCT/US2018/058947—ISA/EPO—dated Jan. 28, 2019.

* cited by examiner

CODE BLOCK GROUP RETRANSMISSION

CROSS-REFERENCE TO RELATED APPLICATIONS UNDER 35 U.S.C. § 119

This application claims priority to U.S. Provisional Patent Application No. 62/587,990, filed on Nov. 17, 2017, entitled "TECHNIQUES AND APPARATUSES FOR CODE BLOCK GROUP RETRANSMISSION," which is hereby expressly incorporated by reference herein.

FIELD OF THE DISCLOSURE

Aspects of the present disclosure generally relate to wireless communication, and more particularly to techniques and apparatuses for code block group retransmission.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication may include transmitting, using a plurality of codewords, a plurality of code block groups, wherein the plurality of codewords includes a first codeword associated with a first set of code block groups, of the plurality of code block groups, and a second codeword associated with a second set of code block groups of the plurality of code block groups. The method may include retransmitting, after a failure associated with at least one code block group of the first set of code block groups, the at least one code block group using the second codeword.

In some aspects, a transmitter device for wireless communication may include memory and one or more processors operatively coupled to the memory. The memory and the one or more processors may be configured to transmit, using a plurality of codewords, a plurality of code block groups, wherein the plurality of codewords includes a first codeword associated with a first set of code block groups, of the plurality of code block groups, and a second codeword associated with a second set of code block groups of the plurality of code block groups. The memory and the one or more processors may be configured to retransmit, after a failure associated with at least one code block group of the first set of code block groups, the at least one code block group using the second codeword.

In some aspects, a non-transitory computer-readable medium may store one or more instructions for wireless communication. The one or more instructions, when executed by one or more processors of a transmitter device, may cause the one or more processors to transmit, using a plurality of codewords, a plurality of code block groups, wherein the plurality of codewords includes a first codeword associated with a first set of code block groups, of the plurality of code block groups, and a second codeword associated with a second set of code block groups of the plurality of code block groups. The one or more instructions, when executed by the one or more processors, may cause the one or more processors to retransmit, after a failure associated with at least one code block group of the first set of code block groups, the at least one code block group using the second codeword.

In some aspects, an apparatus for wireless communication may include means for transmitting, using a plurality of codewords, a plurality of code block groups, wherein the plurality of codewords includes a first codeword associated with a first set of code block groups, of the plurality of code block groups, and a second codeword associated with a second set of code block groups of the plurality of code block groups. The apparatus may include means for retransmitting, after a failure associated with at least one code block group of the first set of code block groups, the at least one code block group using the second codeword.

In some aspects, a method of wireless communication may include transmitting, using a plurality of codewords, a plurality of code block groups, wherein the plurality of codewords includes a first codeword associated with a first set of code block groups, of the plurality of code block groups, and a second codeword associated with a second set of code block groups of the plurality of code block groups.

The method may include retransmitting, after a failure associated with at least one code block group of the first set of code block groups, the at least one code block group using the first codeword. The method may include transmitting, after the failure associated with the at least one code block group of the first set of code block groups and concurrently with the retransmitting, a new transport block using the second codeword.

In some aspects, a transmitter device for wireless communication may include memory and one or more processors operatively coupled to the memory. The memory and the one or more processors may be configured to transmit, using a plurality of codewords, a plurality of code block groups, wherein the plurality of codewords includes a first codeword associated with a first set of code block groups, of the plurality of code block groups, and a second codeword associated with a second set of code block groups of the plurality of code block groups. The memory and the one or more processors may be configured to retransmit, after a failure associated with at least one code block group of the first set of code block groups, the at least one code block group using the first codeword. The memory and the one or more processors may be configured to transmit, after the failure associated with the at least one code block group of the first set of code block groups and concurrently with the retransmitting, a new transport block using the second codeword.

In some aspects, a non-transitory computer-readable medium may store one or more instructions for wireless communication. The one or more instructions, when executed by one or more processors of a transmitter device, may cause the one or more processors to transmit, using a plurality of codewords, a plurality of code block groups, wherein the plurality of codewords includes a first codeword associated with a first set of code block groups, of the plurality of code block groups, and a second codeword associated with a second set of code block groups of the plurality of code block groups. The one or more instructions, when executed by the one or more processors, may cause the one or more processors to retransmit, after a failure associated with at least one code block group of the first set of code block groups, the at least one code block group using the first codeword. The one or more instructions, when executed by the one or more processors, may cause the one or more processors to transmit, after the failure associated with the at least one code block group of the first set of code block groups and concurrently with the retransmitting, a new transport block using the second codeword.

In some aspects, an apparatus for wireless communication may include means for transmitting, using a plurality of codewords, a plurality of code block groups, wherein the plurality of codewords includes a first codeword associated with a first set of code block groups, of the plurality of code block groups, and a second codeword associated with a second set of code block groups of the plurality of code block groups. The apparatus may include means for retransmitting, after a failure associated with at least one code block group of the first set of code block groups, the at least one code block group using the first codeword. The apparatus may include means for transmitting, after the failure associated with the at least one code block group of the first set of code block groups and concurrently with the retransmitting, a new transport block using the second codeword.

Aspects generally include a method, apparatus, device, computer program product, non-transitory computer-readable medium, user equipment, wireless communication device, base station, access point, transmitter device, receiver device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It is noted that while aspects may be described herein using terminology commonly associated with 3G and/or 4G wireless technologies, aspects of the present disclosure can be applied in other generation-based communication systems, such as 5G and later, including NR technologies.

Figure 1:
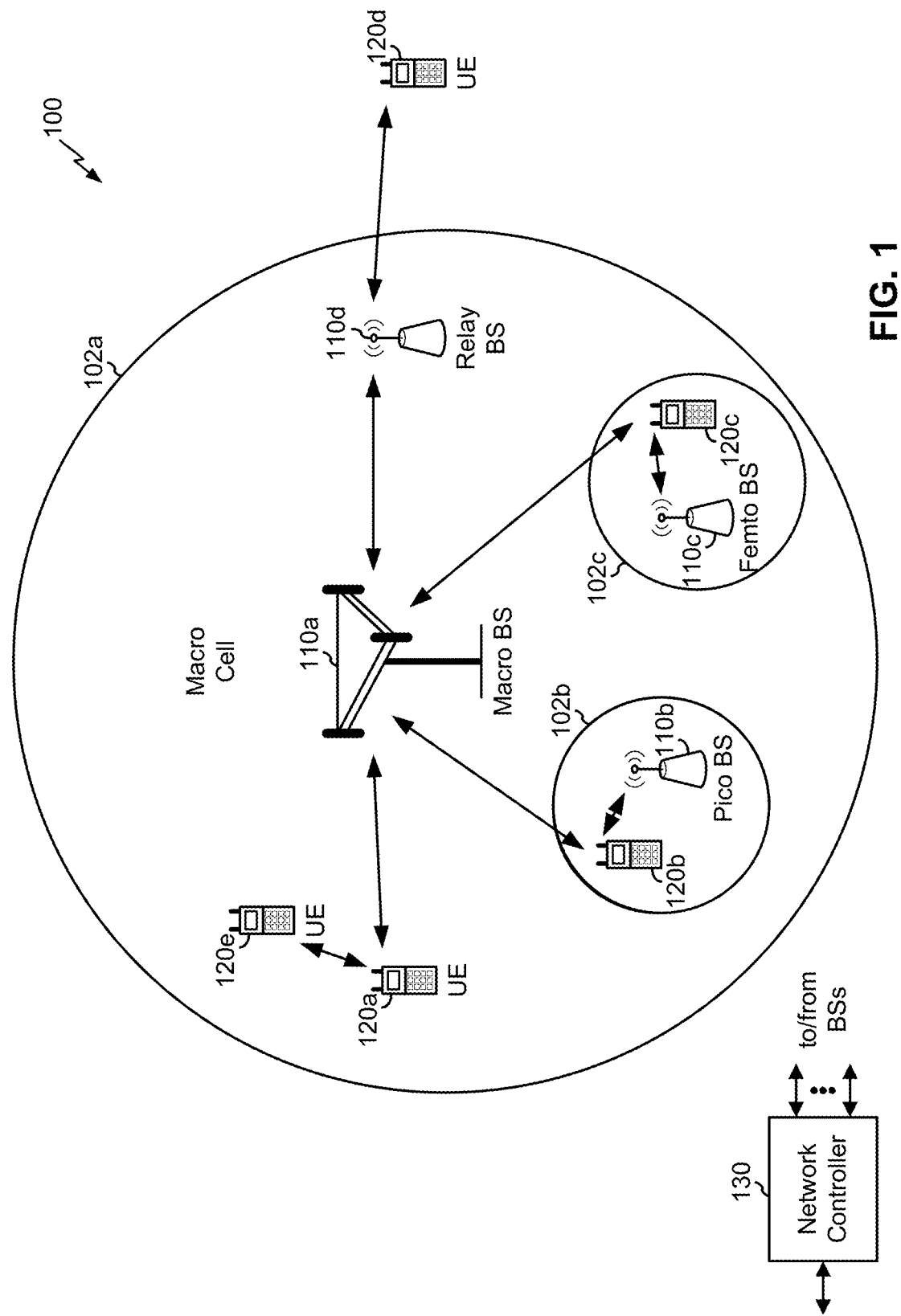
FIG. 1 is a block diagram conceptually illustrating an example of a wireless communication network, in accordance with various aspects of the present disclosure.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, such as sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided merely as an example. Other examples are possible and may differ from what was described with regard to FIG. 1.

Figure 2:
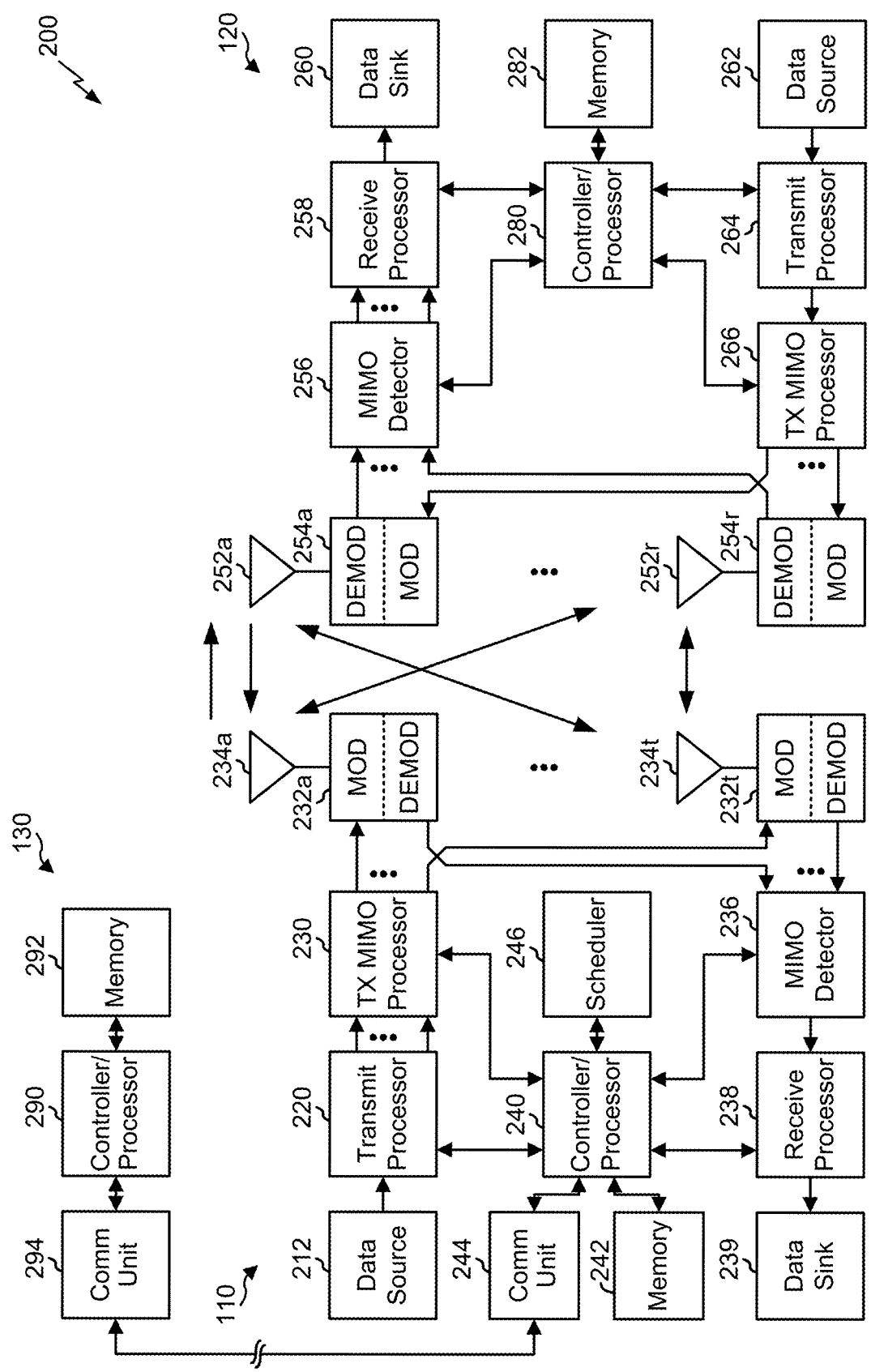
FIG. 2 is a block diagram conceptually illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

In some aspects, one or more components of UE 120 may be included in a housing. Controller/processor 240 of base station 110, controller/processor 280 of UE 120, and/or any other component(s) of FIG. 2 may perform one or more techniques associated with code block group retransmission, as described in more detail elsewhere herein. For example, controller/processor 240 of base station 110, controller/processor 280 of UE 120, and/or any other component(s) of FIG. 2 may perform or direct operations of, for example, process 900 of FIG. 9, process 1000 of FIG. 10, and/or other processes as described herein. Memories 242 and 282 may store data and program codes for base station 110 and UE 120, respectively. A scheduler 246 may schedule UEs for data transmission on the downlink and/or uplink.

In some aspects, a transmitter device, such as base station 110 or UE 120, may include means for transmitting, using a plurality of codewords, a plurality of code block groups; means for retransmitting, after a failure associated with at least one code block group of a first set of code block groups, the at least one code block group using a second codeword; means for retransmitting, after a failure associated with at least one code block group of a first set of code block groups, the at least one code block group using a first codeword; means for transmitting, after the failure associated with the at least one code block group of the first set of code block groups and concurrently with the retransmitting, a new transport block using the second codeword, and/or the like. In some aspects, such means may include one or more components of base station 110 or UE 120 described in connection with FIG. 2.

As indicated above, FIG. 2 is provided merely as an example. Other examples are possible and may differ from what was described with regard to FIG. 2.

Figure 3A:
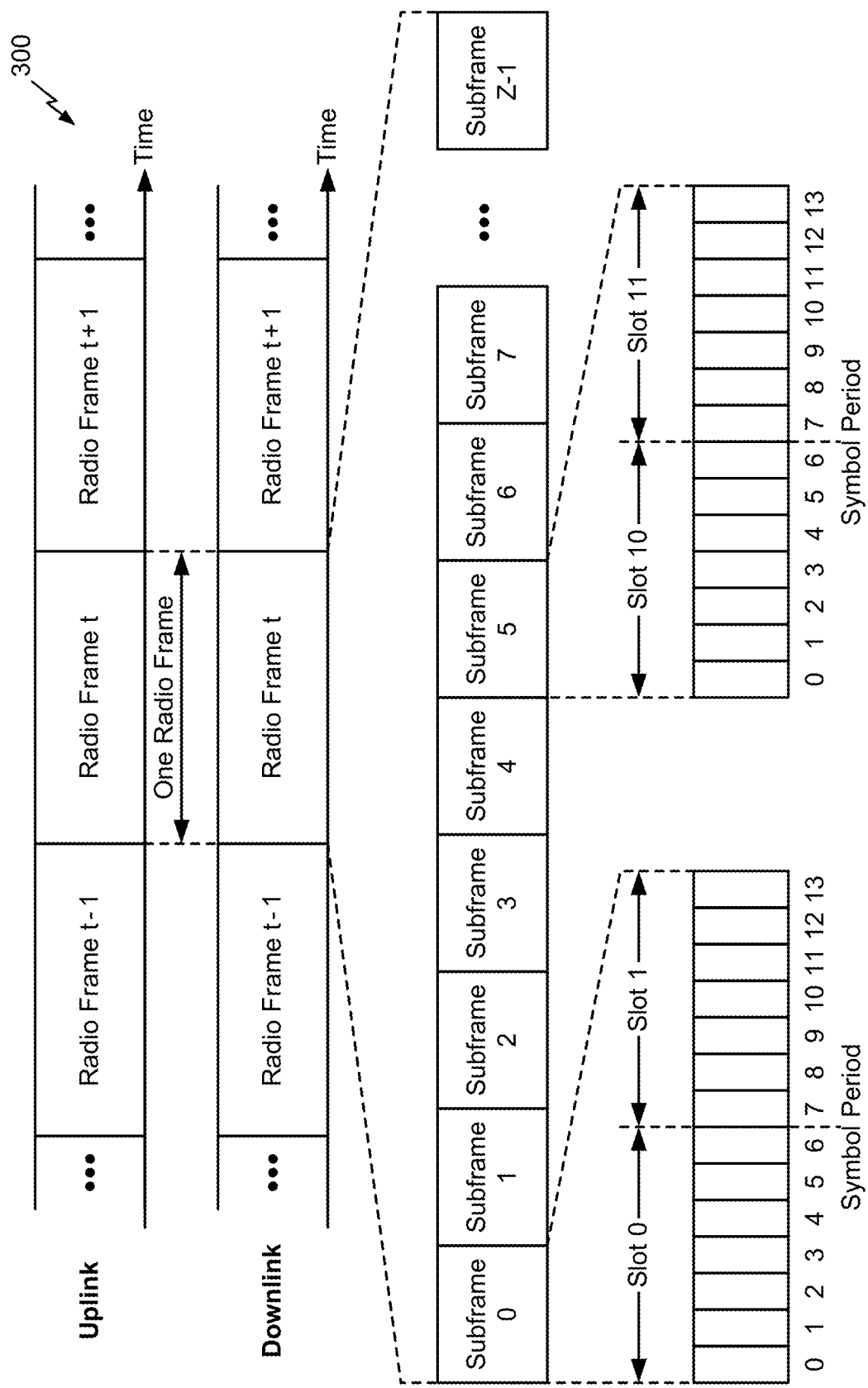
FIG. 3A is a block diagram conceptually illustrating an example of a frame structure in a wireless communication network, in accordance with various aspects of the present disclosure.

FIG. 3A shows an example frame structure 300 for FDD in a telecommunications system (e.g., NR). The transmission timeline for each of the downlink and uplink may be partitioned into units of radio frames. Each radio frame may have a predetermined duration and may be partitions into a set of Z ($Z \geq 1$) subframes (e.g., with indices of 0 through Z-1). Each subframe may include a set of slots (e.g., two slots per subframe are shown in FIG. 3A). Each slot may include a set of L symbol periods. For example, each slot may include seven symbol periods (e.g., as shown in FIG. 3A), fifteen symbol periods, and/or the like. In a case where the subframe includes two slots, the subframe may include 2L symbol periods, where the 2L symbol periods in each subframe may be assigned indices of 0 through 2L-1. In some aspects, a scheduling unit for the FDD may frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
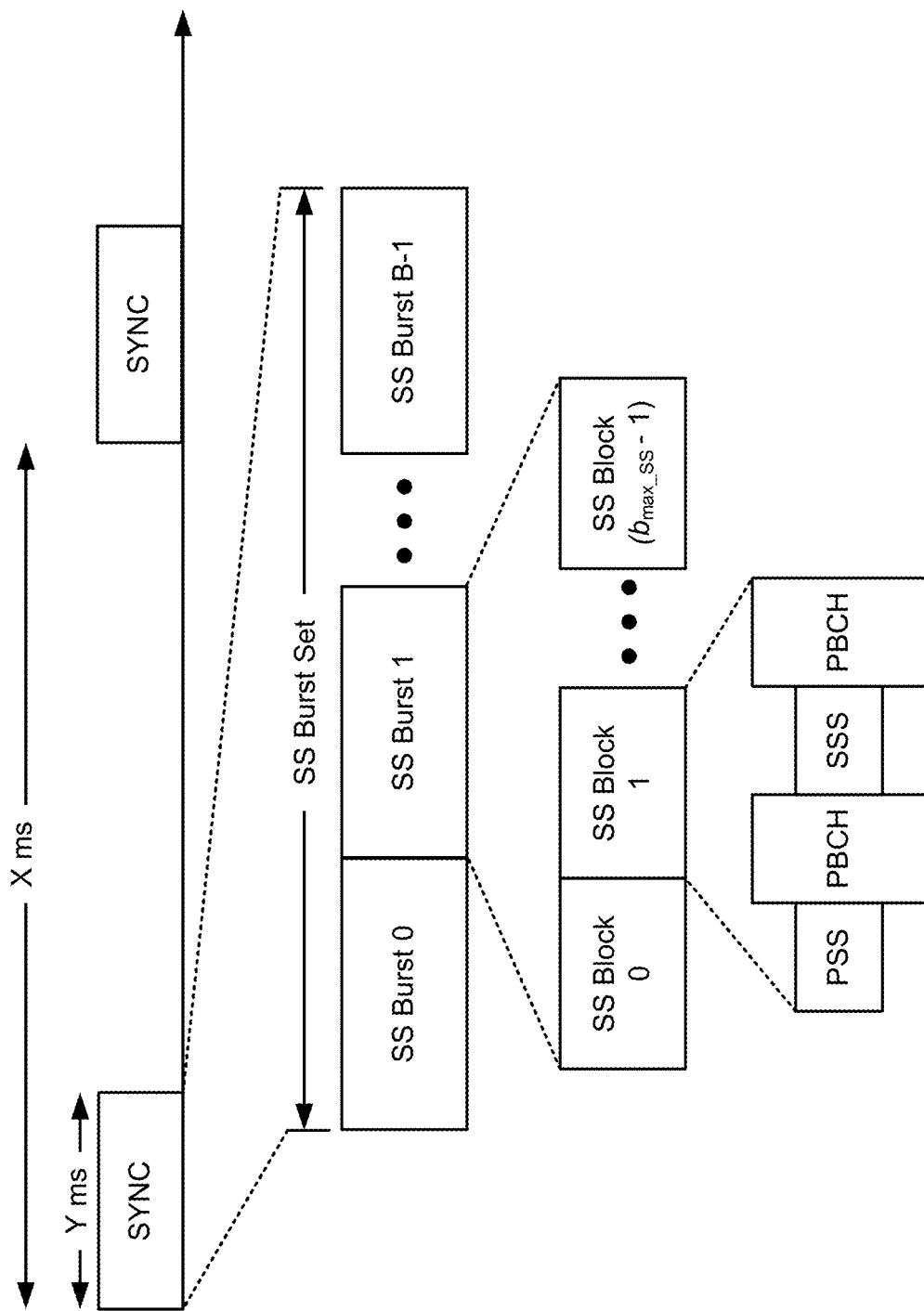
FIG. 3B is a block diagram conceptually illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B-1, where B is a maximum number of repetitions of the SS burst that may be transmitted by the base station). As further shown, each SS burst may include one or more SS blocks (identified as SS block 0 through SS block ($b_{max\_SS-1}$), where $b_{max\_SS-1}$ is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more subframes. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain subframes. The base station may transmit control information/data on a physical downlink control channel (PDCCH) in C symbol periods of a subframe, where B may be configurable for each subframe. The base station may transmit traffic data and/or other data on the PDSCH in the remaining symbol periods of each subframe.

As indicated above, FIGS. 3A and 3B are provided as examples. Other examples are possible and may differ from what was described with regard to FIGS. 3A and 3B.

Figure 4:
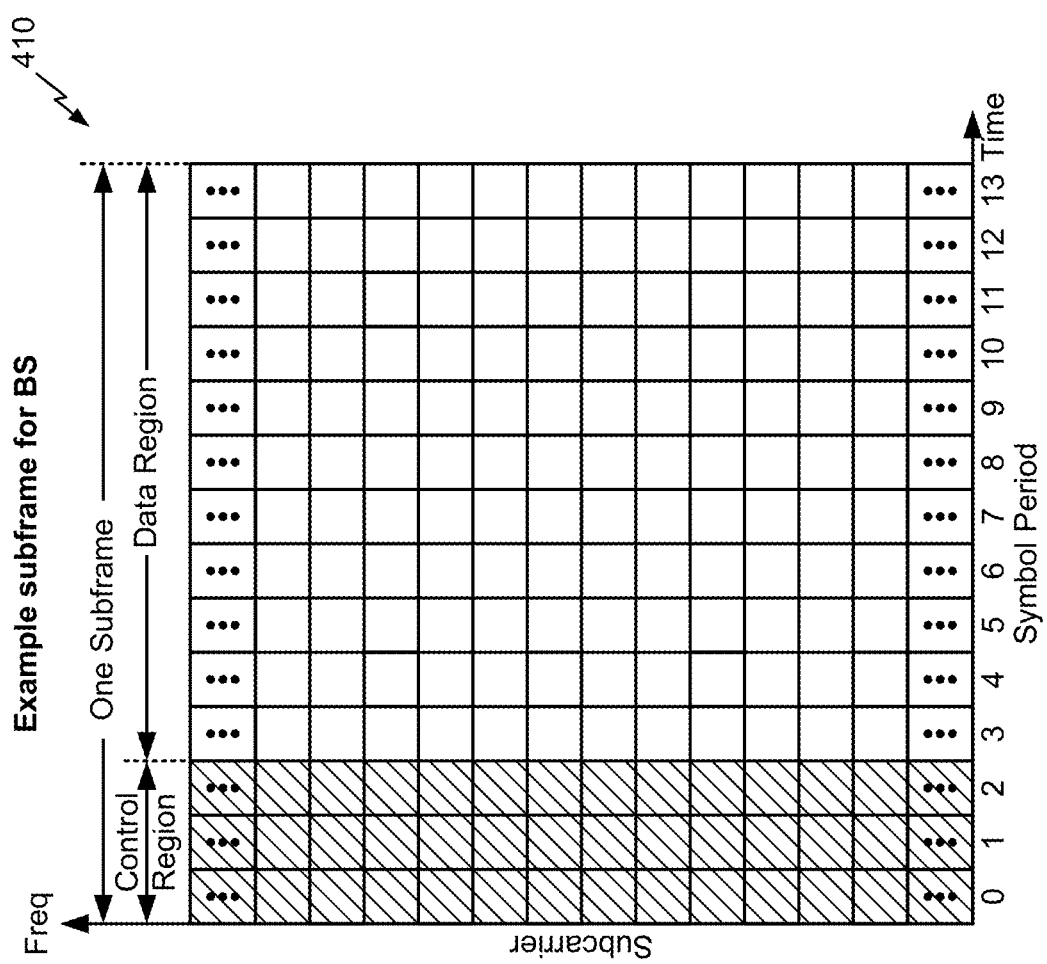
FIG. 4 is a block diagram conceptually illustrating an example subframe format with a normal cyclic prefix, in accordance with various aspects of the present disclosure.

FIG. 4 shows an example subframe format 410 with a normal cyclic prefix. The available time frequency resources may be partitioned into resource blocks. Each resource block may cover a set to of subcarriers (e.g., 12 subcarriers) in one slot and may include a number of resource elements. Each resource element may cover one subcarrier in one symbol period (e.g., in time) and may be used to send one modulation symbol, which may be a real or complex value. In some aspects, subframe format 410 may be used for transmission of SS blocks that carry the PSS, the SSS, the PBCH, and/or the like, as described herein.

An interlace structure may be used for each of the downlink and uplink for FDD in certain telecommunications systems (e.g., NR). For example, Q interlaces with indices of 0 through Q-1 may be defined, where Q may be equal to 4, 6, 8, 10, or some other value. Each interlace may include subframes that are spaced apart by Q frames. In particular, interlace q may include subframes q, q+Q, q+2Q, etc., where $q \in \{0, \ldots, Q-1\}$.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using TDD. In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

In some aspects, a single component carrier bandwidth of 100 MHZ may be supported. NR resource blocks may span 12 sub-carriers with a sub-carrier bandwidth of 60 or 120 kilohertz (kHz) over a 0.1 millisecond (ms) duration. Each radio frame may include 40 subframes with a length of 10 ms. Consequently, each subframe may have a length of 0.25 ms. Each subframe may indicate a link direction (e.g., DL or UL) for data transmission and the link direction for each subframe may be dynamically switched. Each subframe may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units or distributed units.

As indicated above, FIG. 4 is provided as an example. Other examples are possible and may differ from what was described with regard to FIG. 4.

Figure 5:
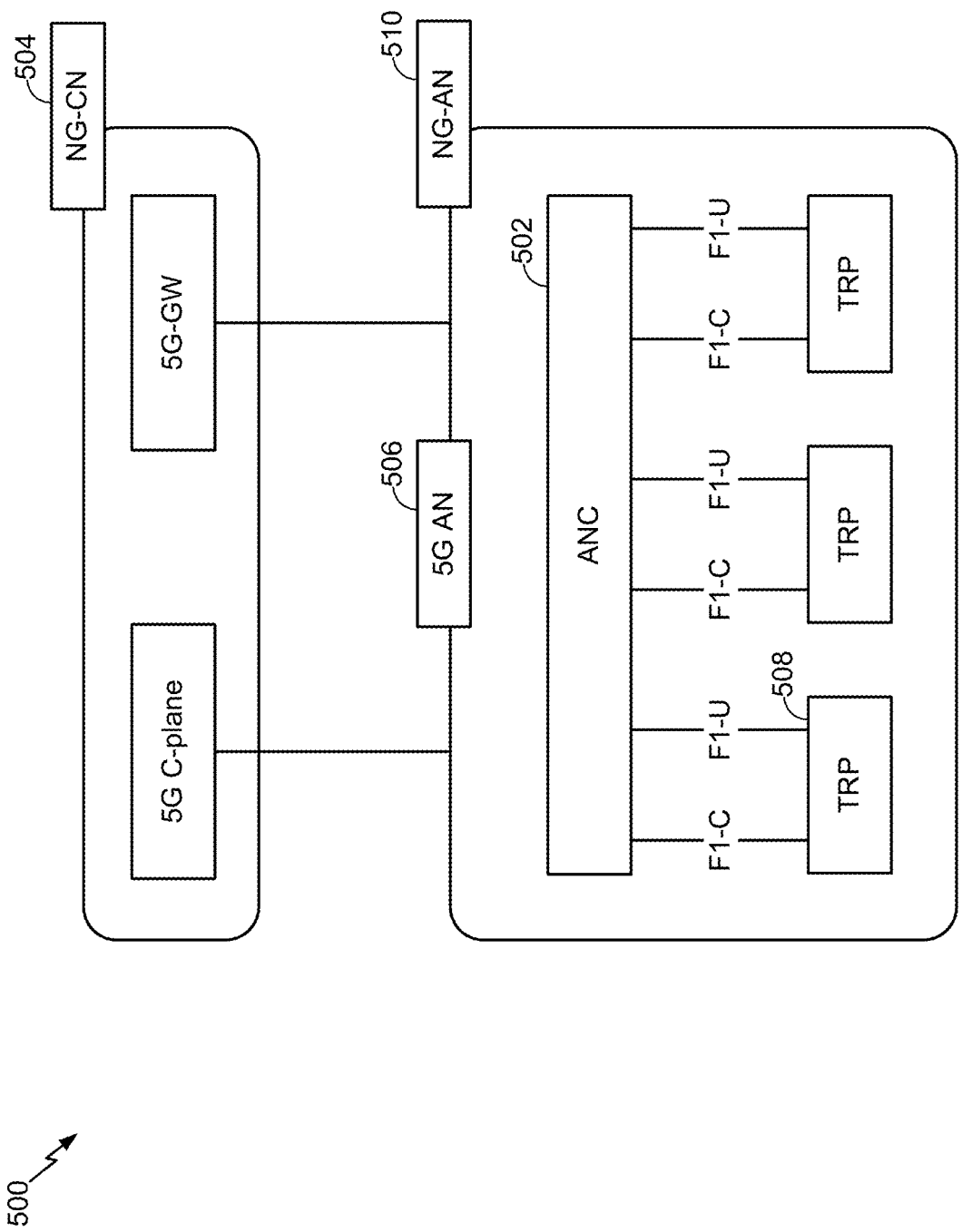
FIG. 5 illustrates an example logical architecture of a distributed radio access network (RAN), in accordance with various aspects of the present disclosure.

FIG. 5 illustrates an example logical architecture of a distributed RAN 500, according to aspects of the present disclosure. A 5G access node 506 may include an access node controller (ANC) 502. The ANC may be a central unit (CU) of the distributed RAN 500. The backhaul interface to the next generation core network (NG-CN) 504 may terminate at the ANC. The backhaul interface to neighboring next generation access nodes (NG-ANs) may terminate at the ANC. The ANC may include one or more TRPs 508 (which may also be referred to as BSs, NR BSs, Node Bs, 5G NBs, APs, gNB, or some other term). As described above, a TRP may be used interchangeably with "cell."

The TRPs 508 may be a distributed unit (DU). The TRPs may be connected to one ANC (ANC 502) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of RAN 500 may be used to illustrate fronthaul definition. The architecture may be defined that support fronthauling solutions across different deployment types. For example, the architecture may be based at least in part on transmit network capabilities (e.g., bandwidth, latency, and/or jitter).

The architecture may share features and/or components with LTE. According to aspects, the next generation AN (NG-AN) 510 may support dual connectivity with NR. The NG-AN may share a common fronthaul for LTE and NR.

The architecture may enable cooperation between and among TRPs 508. For example, cooperation may be preset within a TRP and/or across TRPs via the ANC 502. According to aspects, no inter-TRP interface may be needed/present.

According to aspects, a dynamic configuration of split logical functions may be present within the architecture of RAN 500. The packet data convergence protocol (PDCP), radio link control (RLC), media access control (MAC) protocol may be adaptably placed at the ANC or TRP.

According to various aspects, a BS may include a central unit (CU) (e.g., ANC 502) and/or one or more distributed units (e.g., one or more TRPs 508).

As indicated above, FIG. 5 is provided merely as an example. Other examples are possible and may differ from what was described with regard to FIG. 5.

Figure 6:
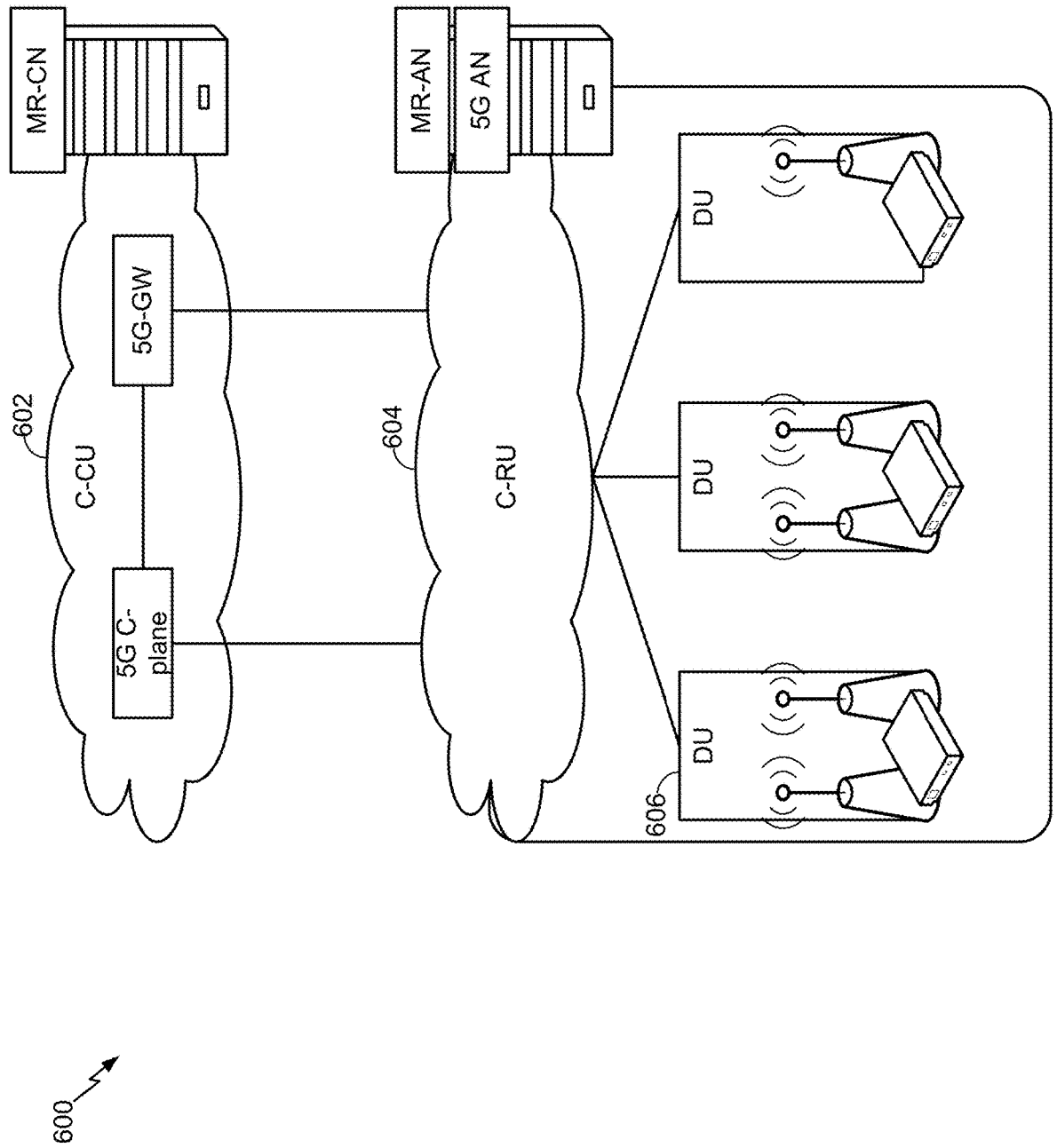
FIG. 6 illustrates an example physical architecture of a distributed RAN, in accordance with various aspects of the present disclosure.

FIG. 6 illustrates an example physical architecture of a distributed RAN 600, according to aspects of the present disclosure. A centralized core network unit (C-CU) 602 may host core network functions. The C-CU may be centrally deployed. C-CU functionality may be offloaded (e.g., to advanced wireless services (AWS)), in an effort to handle peak capacity.

A centralized RAN unit (C-RU) 604 may host one or more ANC functions. Optionally, the C-RU may host core network functions locally. The C-RU may have distributed deployment. The C-RU may be closer to the network edge.

A distributed unit (DU) 606 may host one or more TRPs. The DU may be located at edges of the network with radio frequency (RF) functionality.

As indicated above, FIG. 6 is provided merely as an example. Other examples are possible and may differ from what was described with regard to FIG. 6.

A transmitter device, such as a BS, a UE, and/or the like, may communicate with a receiver device, such as a BS, a UE, and/or the like in a communications system. For example, a first transmitter device (e.g., a BS) may transmit data to a first receiver device (e.g., a UE) on a downlink channel and a second transmitter device (e.g., a UE) may transmit data to a second receiver device (e.g., a BS) on an uplink channel. In some communications systems, such as a 5G communications system and/or the like, the transmitter device may transmit using a plurality codewords. For example, the transmitter device may transmit a first codeword associated with a first transport block and including a first set of code blocks and a second codeword associated with a second transport block and including a second set of code blocks.

The transmitter device may receive feedback information indicating whether the plurality of code blocks were successfully received and/or decoded. To reduce overhead associated with the feedback information relative to identifying each code block that fails to be successfully received and/or decoded, the code blocks may be aggregated into code block groups. In this case, the receiver device may transmit feedback information that identifies one or more code block groups that include at least one code block that was not successfully received and/or decoded. The transmitter device may retransmit, on the first codeword, one or more code block groups, of the first codeword, associated with a failure. Similarly, the transmitter device may retransmit, on the second codeword, one or more code block groups, of the second codeword, associated with a failure. The transmitter device may rate match to enable retransmission of differing quantities of code block groups on each codeword. However, retransmitting unbalanced quantities of code block groups on each codeword, such as using rate matching, may result in an excessive and/or inefficient utilization of network resources.

Some aspects, described herein, may enable redistribution of code block groups to balance retransmission on a plurality of codewords. For example, a transmitter device may determine to retransmit, on the second codeword, a code block group from the first codeword. Some aspects, described herein, may enable transmission of code block groups of a new transport block concurrently with retransmission of code block groups of a previous transport block. For example, the transmitter device may determine a failure of one or more code block groups of a first transport block transmitted on a first codeword, and may determine successful transmission of each code block group of a second transport block transmitted on a second codeword. In this case, the transmitter device may retransmit the one or more code block groups of the first transport block on the first codeword and may transmit a plurality of code block groups of a third transport block on the second codeword. In this way, the transmitter device more efficiently utilizes available network resources, thereby improving utilization of network resources.

Figure 7:
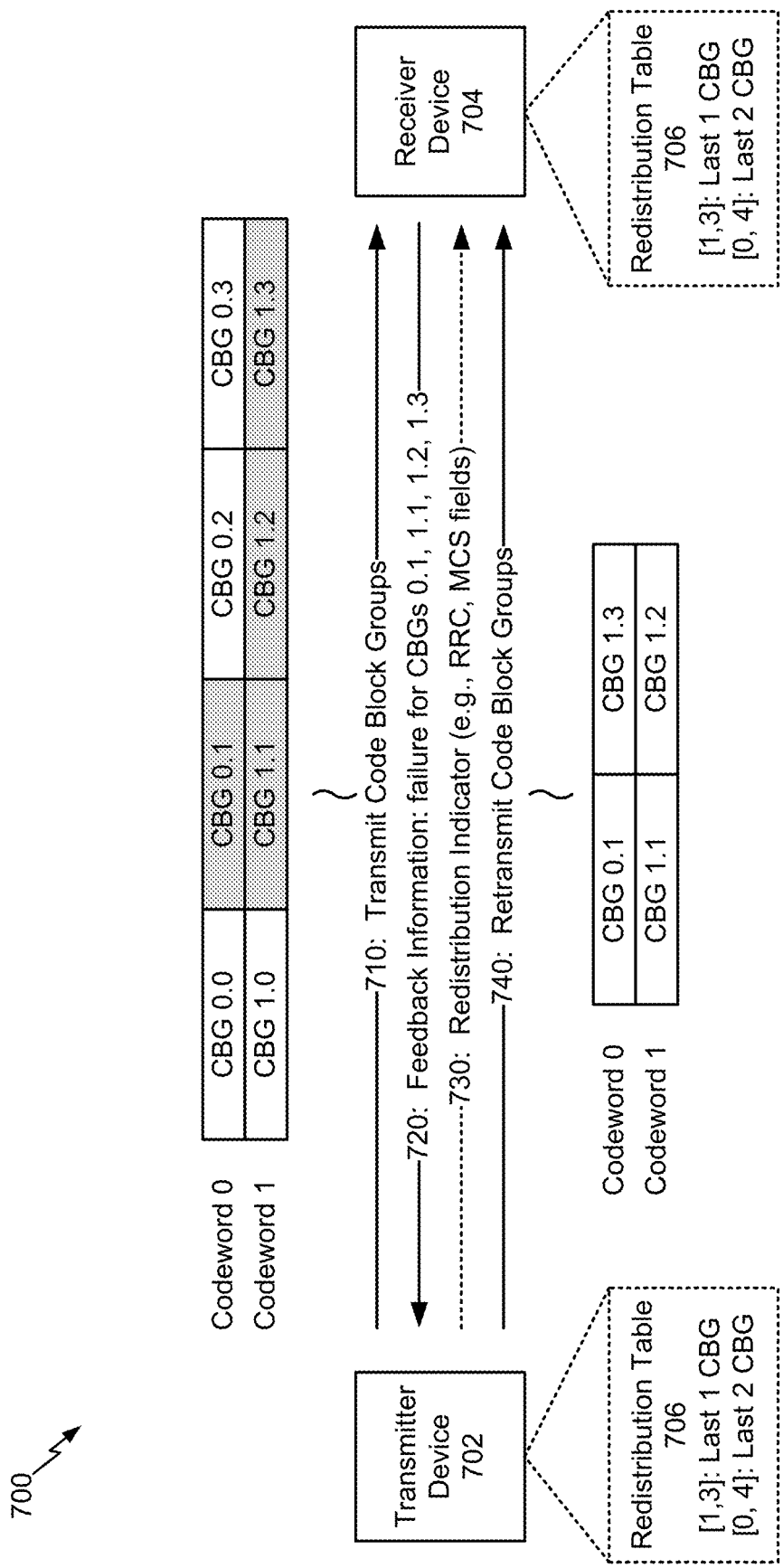
FIG. 7 is a diagram illustrating an example of code block group retransmission, in accordance with various aspects of the present disclosure.

FIG. 7 is a diagram illustrating an example 700 of code block group retransmission, in accordance with various aspects of the present disclosure. As shown in FIG. 7, example 700 includes a transmitter device 702 (e.g., which may correspond to BS 110, UE 120, and/or the like) and a receiver device 704 (e.g., which may correspond to BS 110, UE 120, and/or the like). In some aspects, transmitter device 702 and receiver device 704 may each store a redistribution table 706. For example, redistribution table 706 may indicate a redistribution of code block groups (CBGs) that is to be performed based at least in part on a quantity of code block groups that are to be retransmitted for each codeword.

As further shown in FIG. 7, and by reference number 710, transmitter device 702 may transmit a plurality of code block groups to receiver device 704. For example, transmitter device 702 may transmit, using a first codeword (e.g., Codeword 0), a set of code block groups (e.g., CBG 0.0, CBG 0.1, CBG 0.2, and CBG 0.3). Similarly, transmitter device 702 may transmit, using a second codeword (e.g., Codeword 1), a set of code block groups (e.g., CBG 1.0, CBG 1.1, CBG 1.2, and CBG 1.3).

As further shown in FIG. 7, and by reference number 720, transmitter device 702 may receive feedback information from receiver device 704. For example, transmitter device 702 may receive feedback information indicating that at least one code block of code block groups CBG 0.1, CBG 1.1, CBG 1.2, and CBG 1.3 failed to be successfully received or decoded by receiver device 704. In some aspects, transmitter device 702 may determine to redistribute code block groups of the second codeword to the first codeword based at least in part on receiving the feedback information. For example, based at least in part on the first codeword being associated with fewer code block groups for retransmission than the second codeword, transmitter device 702 may determine to retransmit at least one code block group of the second codeword using the first codeword.

In some aspects, the feedback information may indicate a failure for a code block group for which a code block was successfully received. For example, based at least in part on aggregating code blocks into code block groups, when receiver device 704 successfully receives a first code block of a code block group and is unsuccessful in receiving a second code block of the code block group, receiver device 704 may provide feedback information indicating a failure associated with the code block group. In this case, transmitter device 702 may be caused to retransmit the first code block and the second code block. In other words, transmitter device 702 may retransmit a successfully received and decoded code block with at least one unsuccessfully received and decoded code block.

In some aspects, transmitter device 702 may select a code block group for redistribution based at least in part on the channel conditions. For example, transmitter device 702 may determine, based at least in part on a common channel condition for codeword 0 and codeword 1, to redistribute code block groups for retransmission. Additionally, or alternatively, based at least in part on differing channel conditions, transmitter device 702 may determine not to redistribute code block groups for retransmission, to redistribute a different quantity of code block groups for retransmission, and/or the like.

In some aspects, transmitter device 702 may select a preconfigured set of code block groups for redistribution. For example, based at least in part on stored information, transmitter device 702 may select, from the second codeword, a last transmitted code block group associated with a failure (e.g., CBG 1.3) for redistribution to the first codeword. Alternatively, transmitter device 702 may select a first transmitted code block group associated with a failure (e.g., CBG 1.1) for redistribution to the first codeword. In some aspects, transmitter device 702 may select a plurality of code block groups for redistribution. For example, when codeword 0 is associated with no failures and codeword 1 is associated with 4 failures, transmitter device 702 may redistribute two code block groups from codeword 1 to codeword 0 to balance a quantity of code block groups for retransmission.

In some aspects, transmitter device 702 may select a code block group for redistribution based at least in part on a redistribution table, such as redistribution table 706. For example, transmitter device 702 and receiver device 704 may store a redistribution table 706 identifying a quantity of code block groups to redistribute for a set of code block group failures (e.g., a last 1 code block group for 1 failure in codeword 0 and 3 failures in codeword 1, a last 2 code block groups for 0 failures in codeword 0 and 4 failures in codeword 1, and/or the like). Additionally, or alternatively, redistribution table 706 may indicate redistributions to perform based at least in part on a modulation and coding scheme, a relative rank, a channel condition, and/or the like for the codewords. In this case, transmitter device 702 may perform a table lookup based at least in part on a modulation and coding scheme being used for each codeword, a relative rank of each codeword, a channel condition of the channels, and/or the like to select a code block group for redistribution.

In some aspects, transmitter device 702 may select a code block group for redistribution based at least in part on a rate matching criterion and/or a modulation and coding scheme associated with the first codeword, the second codeword, and/or the like. For example, when codeword 0 is associated with a coding rate that is ½ of a coding rate of codeword 1 and retransmission is to be performed for 4 code block groups of code block 0 and 1 code block group of codeword 1, 2 code block groups of codeword 0 may be redistributed to codeword 1. In this case, the 2 code block groups may be coded as 1 additional code block group of codeword 1 based at least in part on the differing coding rates of codeword 0 and codeword 1. In this way, utilization of network resources is improved relative to altering a coding rate of the codewords to rate match.

As further shown in FIG. 7, and by reference number 730, in some aspects, transmitter device 702 may transmit a redistribution indicator to receiver device 704. For example, in some aspects, transmitter device 702 may transmit a redistribution indicator (e.g., a bit indicator) to indicate that redistribution is performed. Alternatively, receiver device 704 may be configured to determine that redistribution is to be performed as a response to transmitting the feedback information. In this case, transmitter device 702 may forgo transmitting a redistribution indicator.

In some aspects, transmitter device 702 may transmit a redistribution indicator associated with a redistribution table, such as redistribution table 706. For example, transmitter device 702 may transmit an indicator of a table entry for a redistribution table stored by receiver device 704, and receiver device 704 may perform a lookup to identify the redistribution that is to be performed by transmitter device 702. In some aspects, transmitter device 702 may provide radio resource control signaling to indicate that redistribution is to be performed. Additionally, or alternatively, transmitter device 702 may transmit retransmission modulation and coding scheme signaling (e.g., an indication of a modulation order used for retransmission), and may indicate the redistribution using the modulation and coding scheme signaling. For example, transmitter device 702 may transmit the redistribution indicator using one or more bits of one or more modulation and coding scheme (MCS) fields of a downlink control information message.

As further shown in FIG. 7, and by reference number 740, transmitter device 702 may retransmit code block groups to receiver device 704. For example, transmitter device 702 may retransmit code block groups CBG 0.1, CBG 1.3 using codeword 0 and CBG 1.1, and CBG 1.2 using codeword 1. In this case, CBG 1.3 is redistributed from codeword 1 to codeword 0 to cause codeword 0 and codeword 1 to be associated with the same quantity of code block groups for retransmission. In some aspects, code block groups associated with a plurality of codewords may be retransmitted using a common group of resource blocks. For example, when CBG 1.3 of codeword 1 is redistributed and retransmitted using codeword 0, CBG 1.3 and CBG 0.1 may be retransmitted using a common group of resource blocks of codeword 0. In some aspects, transmitter device 702 may transmit a common quantity of resource blocks for codeword 0 and codeword 1.

As indicated above, FIG. 7 is provided as an example. Other examples are possible and may differ from what was described with respect to FIG. 7.

Figure 8:
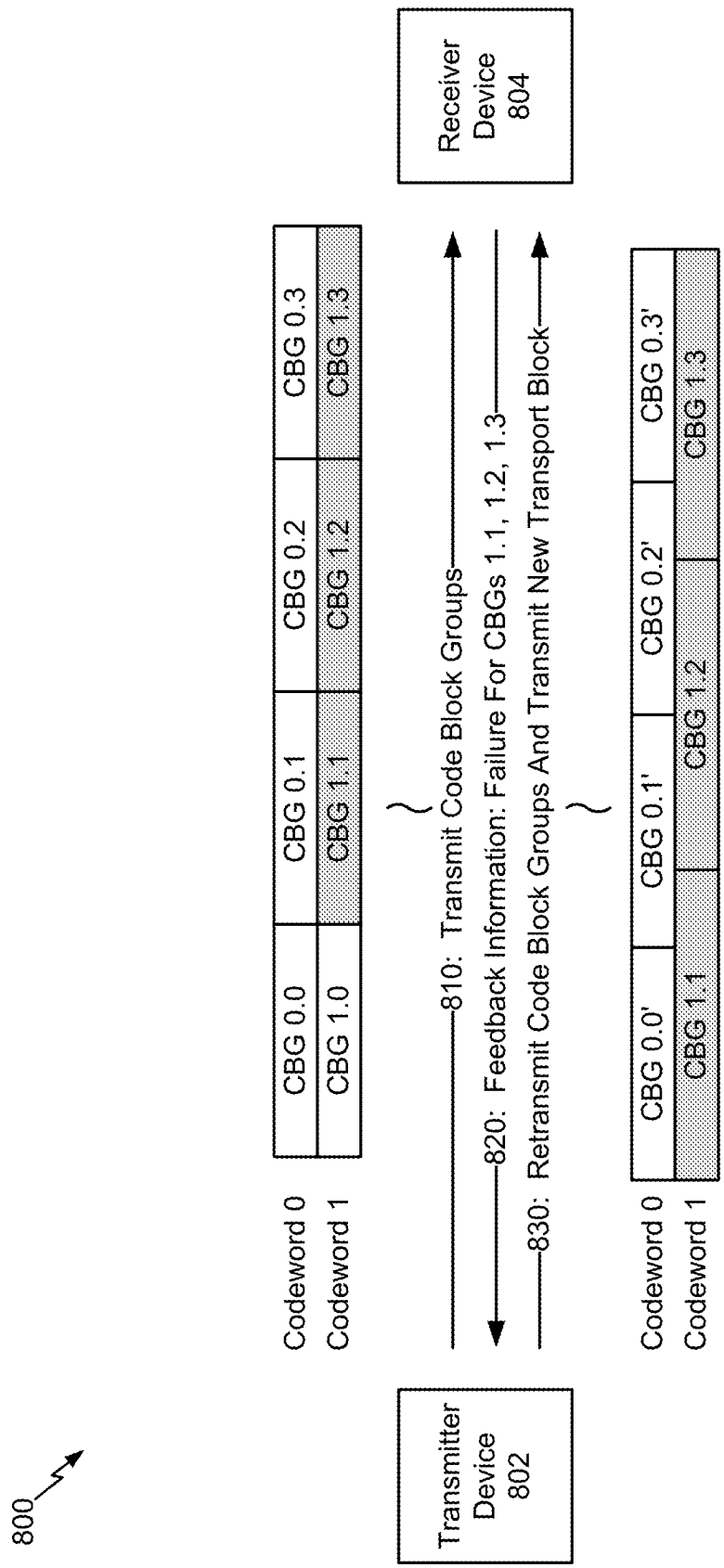
FIG. 8 is a diagram illustrating an example of code block group retransmission, in accordance with various aspects of the present disclosure.

FIG. 8 is a diagram illustrating an example 800 of code block group retransmission, in accordance with various aspects of the present disclosure. As shown in FIG. 8, example 800 includes a transmitter device 802 (e.g., which may correspond to BS 110, UE 120, and/or the like) and a receiver device 804 (e.g., which may correspond to BS 110, UE 120, and/or the like).

As further shown in FIG. 8, and by reference number 810, transmitter device 802 may transmit a plurality of code block groups to receiver device 804. For example, transmitter device 802 may transmit, using a first codeword (e.g., Codeword 0), a set of code block groups (e.g., CBG 0.0, CBG 0.1, CBG 0.2, and CBG 0.3) of a first transport block. Similarly, transmitter device 802 may transmit, using a second codeword (e.g., Codeword 1), a set of code block groups (e.g., CBG 1.0, CBG 1.1, CBG 1.2, and CBG 1.3) of a second transport block.

As further shown in FIG. 8, and by reference number 820, transmitter device 802 may receive, from receiver device 804, feedback information. For example, transmitter device 802 may receive feedback information indicating that at least one code block of code block groups CBG 1.1, CBG 1.2, and CBG 1.3 failed to be successfully received and/or decoded by receiver device 804. In some aspects, transmitter device 802 may receive feedback information relating to a code block group including a code block that is successfully received. For example, based at least in part on aggregating code blocks into a code block group, and when a code block group includes a first code block that is successfully received and a second code block that is not successfully received, receiver device 804 may provide feedback information identifying the code block group. In this case, transmitter device 802 may retransmit the code block group including the first code block that is successfully received.

In some aspects, transmitter device 802 may determine to transmit a new transport block concurrent with retransmitting code block groups of a previous transport block. For example, based at least in part on codeword 1 being associated with code block group failures, transmitter device 802 may determine to retransmit code block groups of codeword 1, and, based at least in part on codeword 0 not being associated with code block group failures, channel conditions, codeword rank, and/or the like, transmitter device 802 may determine to transmit code block groups of a third transport block concurrent with retransmission using codeword 1.

As further shown in FIG. 8, and by reference number 830, transmitter device 802 may retransmit one or more code block groups and may transmit a new transport block to receiver device 804. For example, transmitter device 802 may retransmit code block groups CBG 1.1, CBG 1.2, and CBG1.3 using the second codeword and may transmit code blocks of a new transport block, CBG0.0', CBG0.1', CBG 0.2', and CBG 0.3' using codeword 0 and concurrently with transmitting using codeword 1. In this case, based at least in part on the first codeword and the second codeword being associated with a common quantity of resource blocks, a quantity code block groups for retransmission, a quantity of code block groups of the new transport block, a rank of the respective codewords, a channel condition, and/or the like, transmitter device 802 may rate match between codeword 0 and codeword 1.

In some aspects, transmitter device 802 may provide a transport block indicator (e.g., via a radio resource control message) to indicate that transmitter device 802 is to transmit code block groups of a new transport block using the first codeword and retransmission of code blocks using the second codeword. Additionally, or alternatively, transmitter device 802 and receiver device 804 may store configuration information indicating that transmitter device 802 is to transmit the transport block as a response to receiving the feedback information indicating a failure of code block groups on codeword 1 and the success of each code block group on codeword 0. In this case, transmitter device 802 may forgo transmitting a transport block indicator.

As indicated above, FIG. 8 is provided as an example. Other examples are possible and may differ from what was described with respect to FIG. 8.

Figure 9:
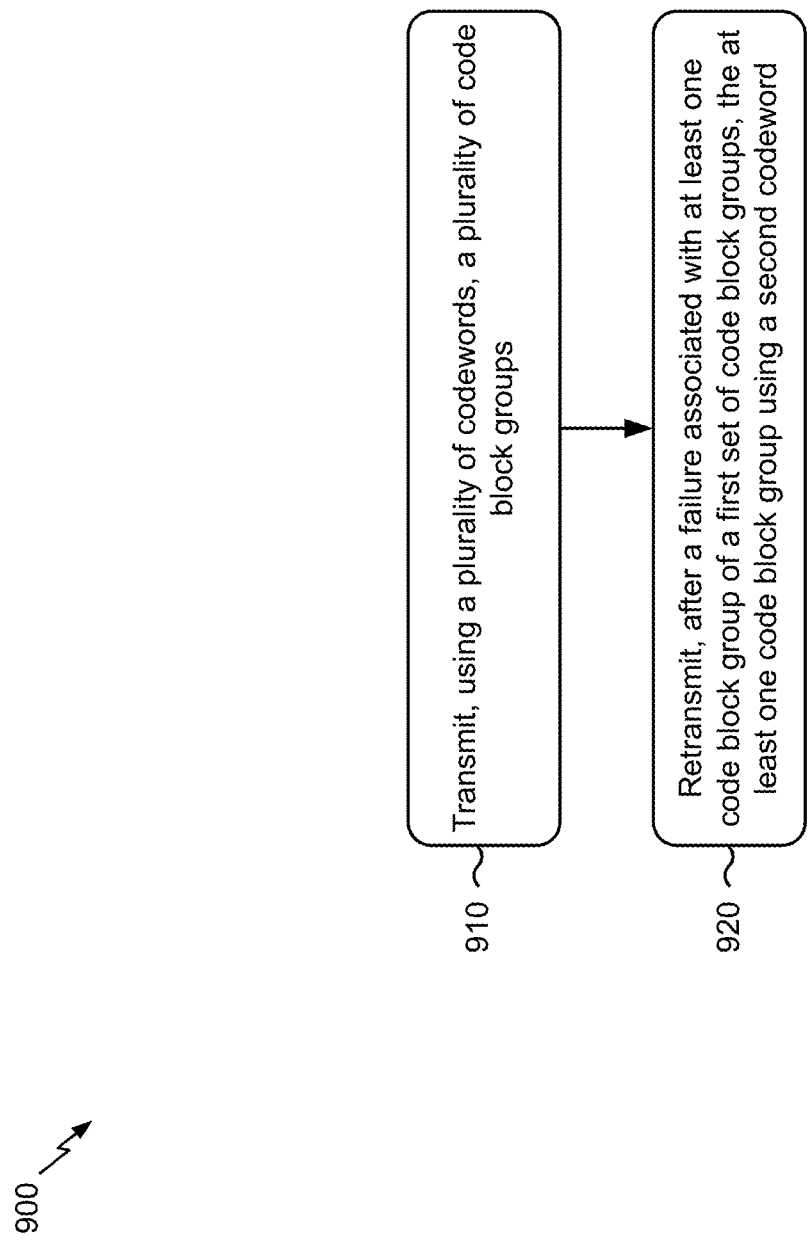
FIG. 9 is a diagram illustrating an example process performed, for example, by a transmitter device, in accordance with various aspects of the present disclosure.

FIG. 9 is a diagram illustrating an example process 900 performed, for example, by a transmitter device, in accordance with various aspects of the present disclosure. Example process 900 is an example where a transmitter device (e.g., BS 110, UE 120, transmitter device 702, transmitter device 802, and/or the like) performs code block group retransmission.

As shown in FIG. 9, in some aspects, process 900 may include transmitting, using a plurality of codewords, a plurality of code block groups (block 910). For example, the transmitter device (e.g., using controller/processor 240, transmit processor 220, TX MIMO processor 230, MOD 232, antenna 234, controller/processor 280, transmit processor 264, TX MIMO processor 266, MOD 254, antenna 252, and/or the like) may transmit, using the plurality of codewords, the plurality of code block groups, wherein the plurality of codewords includes a first codeword associated with a first set of code block groups, of the plurality of code block groups, and a second codeword associated with a second set of code block groups of the plurality of code block groups, as described in more detail above.

As shown in FIG. 9, in some aspects, process 900 may include retransmitting, after a failure associated with at least one code block group of a first set of code block groups, the at least one code block group using a second codeword (block 920). For example, the transmitter device (e.g., using controller/processor 240, transmit processor 220, TX MIMO processor 230, MOD 232, antenna 234, controller/processor 280, transmit processor 264, TX MIMO processor 266, MOD 254, antenna 252, and/or the like) may retransmit after the failure associated with at least one code block group of the first set of code block groups, the at least one code block group using the second codeword, as described in more detail above.

Process 900 may include additional aspects, such as any single aspect or any combination of aspects described below.

In some aspects, the at least one code block group is retransmitted using the second codeword based at least in part on a quantity of code block group failures associated with the second codeword being less than a quantity of code block group failures associated with the first codeword. In some aspects, the at least one code block group and another one or more code block groups are retransmitted using a common group of resource blocks of the second codeword. In some aspects, the first codeword and the second codeword are associated with a common quantity of resource blocks.

In some aspects, the failure associated with the at least one code block group is determined based at least in part on received feedback information relating to the at least one code block group. In some aspects, the failure associated with the at least one code block group is determined based at least in part on unsuccessfully receiving or decoding a code block of the at least one code block group. In some aspects, the at least one code block group includes at least one successfully received code block and at least one unsuccessfully received code block. In some aspects, the failure is associated with two or more code block groups, and the at least one code block group is selected for retransmission using the second codeword based at least in part on a redistribution table.

In some aspects, the failure is associated with two or more code block groups, and the at least one code block group is selected for retransmission using the second codeword based at least in part on a channel condition. In some aspects, a redistribution indicator is provided to indicate redistribution of the at least one code block group to the second codeword. In some aspects, a redistribution indicator indicating redistribution of the at least one code block group to the second codeword is provided using a radio resource control message. In some aspects, redistribution of the at least one code block group to the second codeword is determined based at least in part on stored configuration information.

In some aspects, the at least one code block group is retransmitted using the second codeword based at least in part on a modulation and coding scheme associated with the plurality of codewords. In some aspects, the at least one code block group is retransmitted using the second codeword based at least in part on a rank of the first codeword and a rank of the second codeword. In some aspects, the at least one code block group is retransmitted using the second codeword based at least in part on a rate matching criterion.

In some aspects, redistribution of the at least one code block group to the second codeword is signaled using modulation and coding scheme signaling. In some aspects, two or more code block groups of the at least one code block group are coded using a single code block group of the second codeword.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
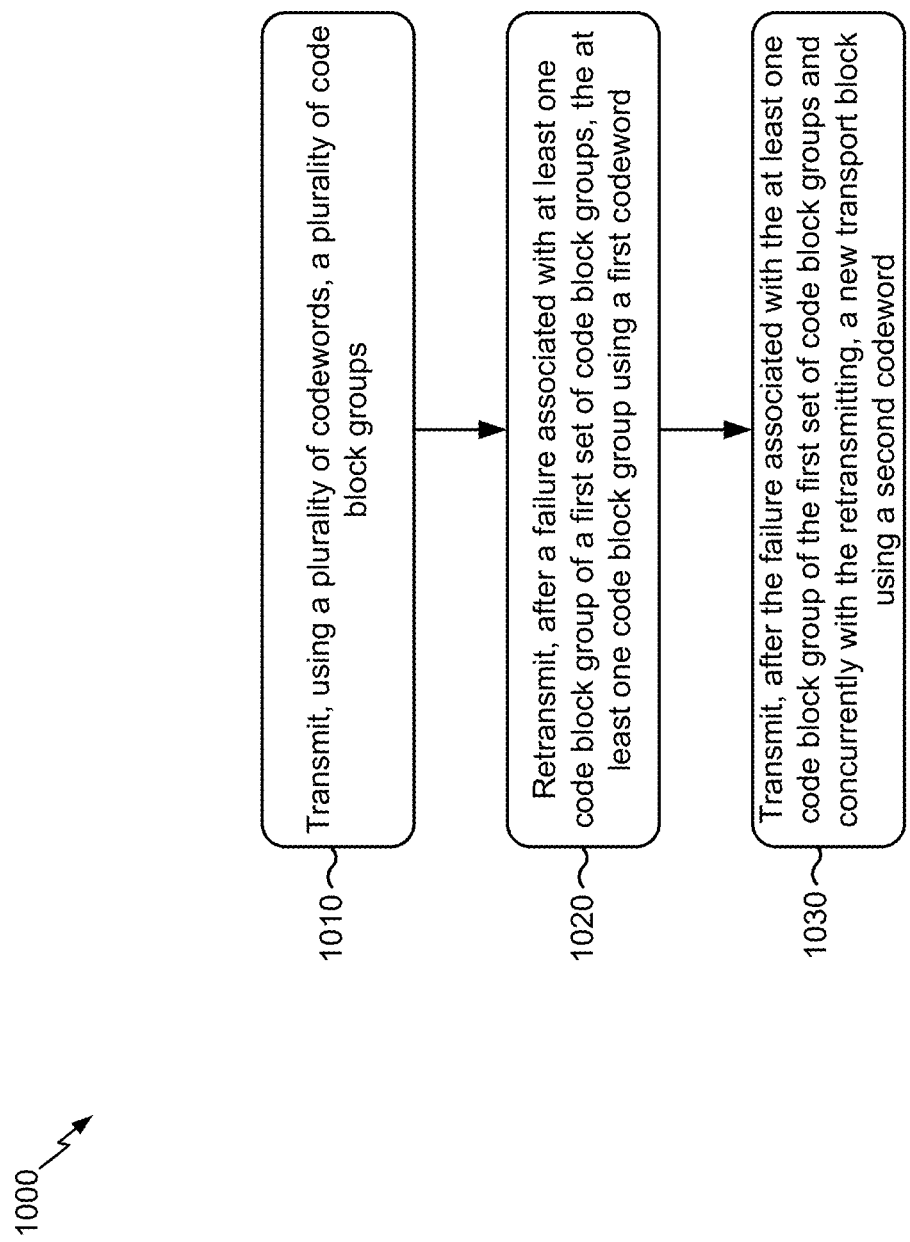
FIG. 10 is a diagram illustrating an example process performed, for example, by a transmitter device, in accordance with various aspects of the present disclosure.

FIG. 10 is a diagram illustrating an example process 1000 performed, for example, by a transmitter device, in accordance with various aspects of the present disclosure. Example process 1000 is an example where a transmitter device (e.g., BS 110, UE 120, transmitter device 702, transmitter device 802, and/or the like) performs code block group retransmission.

As shown in FIG. 10, in some aspects, process 1000 may include transmitting, using a plurality of codewords, a plurality of code block groups (block 1010). For example, the transmitter device (e.g., using controller/processor 240, transmit processor 220, TX MIMO processor 230, MOD 232, antenna 234, controller/processor 280, transmit processor 264, TX MIMO processor 266, MOD 254, antenna 252, and/or the like) may transmit the plurality of code block groups, wherein the plurality of codewords includes a first codeword associated with a first set of code block groups, of the plurality of code block groups, and a second codeword associated with a second set of code block groups of the plurality of code block groups, as described in more detail above.

As shown in FIG. 10, in some aspects, process 1000 may include retransmitting, after a failure associated with at least one code block group of a first set of code block groups, the at least one code block group using a first codeword (block 1020). For example, the transmitter device (e.g., using controller/processor 240, transmit processor 220, TX MIMO processor 230, MOD 232, antenna 234, controller/processor 280, transmit processor 264, TX MIMO processor 266, MOD 254, antenna 252, and/or the like) may retransmit, after the failure associated with the at least one code block group of the first set of code block groups, the at least one code block group using the first codeword, as described in more detail above.

As shown in FIG. 10, in some aspects, process 1000 may include transmitting, after the failure associated with the at least one code block group of the first set of code block groups and concurrently with the retransmitting, a new transport block using a second codeword (block 1030). For example, the transmitter device (e.g., using controller/processor 240, transmit processor 220, TX MIMO processor 230, MOD 232, antenna 234, controller/processor 280, transmit processor 264, TX MIMO processor 266, MOD 254, antenna 252, and/or the like) may transmit, after the failure associated with the at least one code block group of the first set of code block groups and concurrently with retransmitting the at least one code block group, the new transport block using the second codeword, as described in more detail above.

Process 1000 may include additional aspects, such as any single aspect or any combination of aspects described below.

In some aspects, the new transport block is transmitted using the second codeword based at least in part on the second codeword not being associated with a code block group failure. In some aspects, the first codeword and the second codeword are associated with a common quantity of resource blocks. In some aspects, the failure associated with the at least one code block group is determined based at least in part on received feedback information relating to the at least one code block group.

In some aspects, the failure associated with the at least one code block group is determined based at least in part on unsuccessfully receiving or decoding a code block of the at least one code block group. In some aspects, the at least one code block group includes at least one successfully received code block and at least one unsuccessfully received code block. In some aspects, a new transport block indicator is provided to indicate transmission of the new transport block using the second codeword.

In some aspects, a new transport block indicator indicating transmission of the new transport block using the second codeword is provided using a radio resource control message. In some aspects, transmission of the new transport block using the second codeword is determined based at least in part on stored configuration information.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

The foregoing disclosure provides illustration and description, but is not intended to be exhaustive or to limit the aspects to the precise form disclosed. Modifications and variations are possible in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the term "one" or similar language is used. Also, as used herein, the terms "has," "have," "having," and/or the like are intended to be openended terms. Further, the phrase "based on" is intended to mean "based, at least in part, on" unless explicitly stated otherwise.

What is claimed is:

1. A method of wireless communication performed by a transmitter device, comprising:
   transmitting concurrently a first codeword with a first set of code block groups of a plurality of code block groups and a second codeword with a second set of code block groups of the plurality of code block groups; and
   retransmitting, upon receiving an indication of a failure associated with at least one code block group of the first set of code block groups and no indication of any failure associated with the second set of code block groups, the first codeword with at least part of the second set of code block groups.

2. The method of claim 1, wherein the at least one code block group is retransmitted concurrently with transmission of code block groups of a new transport block.

3. The method of claim 1, wherein the at least one code block group and another one or more code block groups are retransmitted using a common group of resource blocks of the second codeword.

4. The method of claim 1, wherein the first codeword and the second codeword are associated with a common quantity of resource blocks.

5. The method of claim 1, wherein the failure associated with the at least one code block group is determined based at least in part on received feedback information relating to the at least one code block group.

6. The method of claim 1, wherein the failure associated with the at least one code block group is determined based at least in part on unsuccessfully receiving or decoding a code block of the at least one code block group.

7. The method of claim 1, wherein the at least one code block group includes at least one successfully received code block and at least one unsuccessfully received code block.

8. The method of claim 1, wherein the failure is associated with two or more code block groups; and
   wherein the at least one code block group is selected for retransmission based at least in part on a redistribution table.

9. The method of claim 1, wherein the failure is associated with two or more code block groups; and
   wherein the at least one code block group is selected for retransmission based at least in part on a channel condition.

10. The method of claim 1, wherein a redistribution indicator is provided to indicate redistribution of the at least one code block group to the second codeword.

11. The method of claim 1, wherein a redistribution indicator indicating redistribution of the at least one code block group is provided using a radio resource control message.

12. The method of claim 1, wherein redistribution of the at least one code block group is determined based at least in part on stored configuration information.

13. The method of claim 1, wherein the at least one code block group is retransmitted based at least in part on a modulation and coding scheme associated with the plurality of codewords.

14. The method of claim 1, wherein the at least one code block group is retransmitted based at least in part on a rank of the first codeword and a rank of the second codeword.

15. The method of claim 1, wherein the at least one code block group is retransmitted based at least in part on a rate matching criterion.

16. The method of claim 1, wherein redistribution of the at least one code block group is signaled using modulation and coding scheme signaling.

17. The method of claim 1, wherein two or more code block groups of the at least one code block group are coded using a single code block group of the second codeword.

18. A non-transient computer-readable medium storing computer executable code, comprising code to:
   transmit concurrently a first codeword with a first set of code block groups of a plurality of code block groups and a second codeword with a second set of code block groups of the plurality of code block groups;
   retransmit, upon receiving an indication of a failure associated with at least one code block group of the first set of code block groups, and no indication of any failure associated with the second set of code block groups, the first codeword with at least part of the second set of code block groups.

19. The non-transient computer-readable medium of claim 18, wherein a new transport block is transmitted based at least in part on the second codeword not being associated with a code block group failure.

20. The non-transient computer-readable medium of claim 18, wherein the first codeword and the second codeword are associated with a common quantity of resource blocks.

21. The non-transient computer-readable medium of claim 18, wherein the failure associated with the at least one code block group is determined based at least in part on received feedback information relating to the at least one code block group.

22. The non-transient computer-readable medium of claim 18, wherein the failure associated with the at least one code block group is determined based at least in part on unsuccessfully receiving or decoding a code block of the at least one code block group.

23. The non-transient computer-readable medium of claim 18, wherein the at least one code block group includes at least one successfully received code block and at least one unsuccessfully received code block.

24. The non-transient computer-readable medium of claim 18, wherein a new transport block indicator is provided to indicate transmission of a new transport block.

25. The non-transient computer-readable medium of claim 18, wherein a new transport block indicator indicating transmission of a new transport block is provided using a radio resource control message.

26. The non-transient computer-readable medium of claim 18, wherein transmission of a new transport block is determined based at least in part on stored configuration information.

27. A transmitter device for wireless communication, comprising:
   memory; and
   one or more processors coupled to the memory, the memory and the one or more processors configured to:
   transmit concurrently a first codeword with a first set of code block groups of a plurality of code block groups and a second codeword with a second set of code block groups of the plurality of code block groups;
   retransmit, upon receiving an indication of a failure associated with at least one code block group of the first set of code block groups and no indication of any failure associated with the second set of code block groups, the first codeword with at least part of the second set of code block groups.

28. The transmitter device of claim 27, wherein the at least one code block group is retransmitted concurrently with transmission of code block groups of a new transport block.

* * * * *